Figure 1:
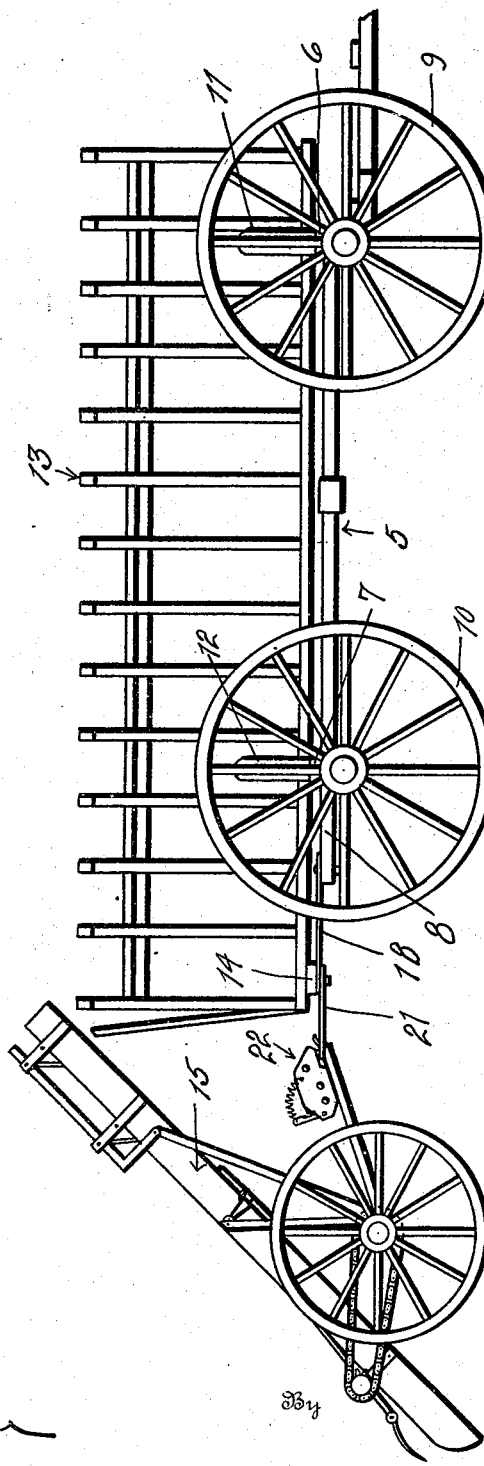

J. D. BAIRD.
COUPLING APPARATUS FOR HAY RACKS AND HAY LOADERS.
APPLICATION FILED OCT. 19, 1915.

1,191,385.

Patented July 18, 1916.
2 SHEETS—SHEET 1.

Witnesses
Wynne Johnson

Inventor
J. D. Baird
By
C. L. Parker
Attorney

J. D. BAIRD.
COUPLING APPARATUS FOR HAY RACKS AND HAY LOADERS.
APPLICATION FILED OCT. 19, 1915.
1,191,385.
Patented July 18, 1916.
2 SHEETS—SHEET 2.
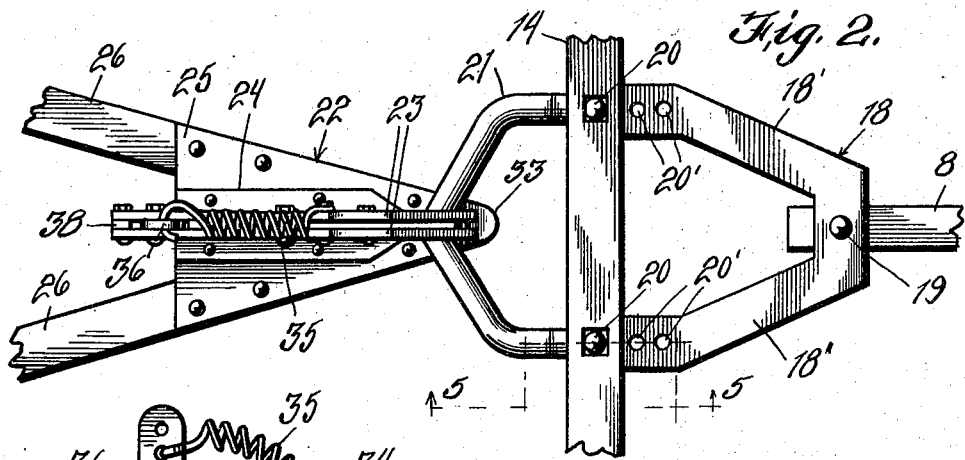
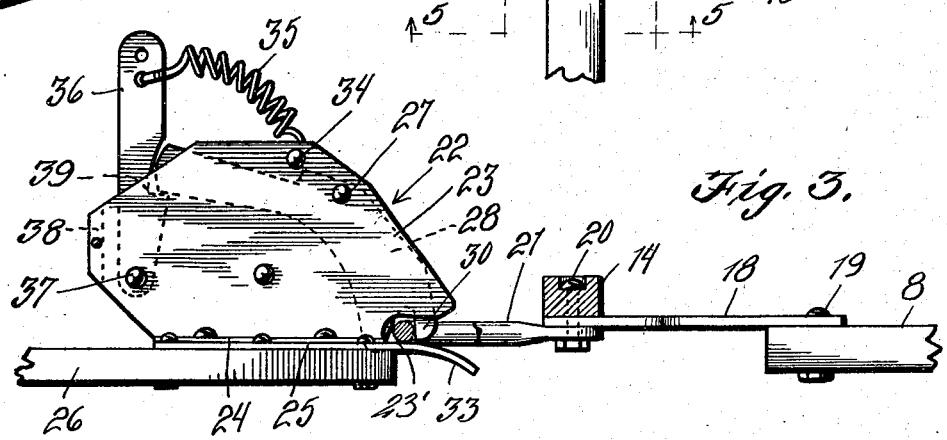
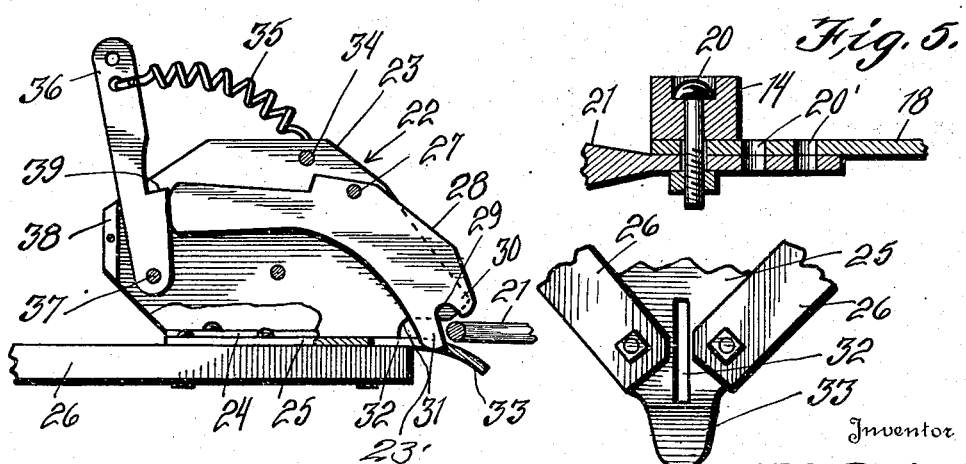
Witnesses
Inventor
J. D. Baird
By C. L. Parker, Attorney

UNITED STATES PATENT OFFICE.

JAMES D. BAIRD, OF RED OAK, IOWA.

COUPLING APPARATUS FOR HAY-RACKS AND HAY-LOADERS.

1,191,385.   Specification of Letters Patent.   Patented July 18, 1916.

Application filed October 19, 1915. Serial No. 56,722.

*To all whom it may concern:*

Be it known that I, JAMES D. BAIRD, a citizen of the United States, residing at Red Oak, in the county of Montgomery and State of Iowa, have invented certain new and useful Improvements in Coupling Apparatus for Hay-Racks and Hay-Loaders, of which the following is a specification.

My invention relates to simple and reliable coupling means for connecting a hay rack and hay loader together, and with the pole of the running gear of a wagon.

An important object of the invention is to provide apparatus of the above mentioned character, which is simple in construction, inexpensive to manufacture, strong, durable, and convenient in use.

Other objects and advantages of the invention will be apparent during the course of the following description.

In the accompanying drawings forming a part of this specification and in which like numerals are employed to designate like parts throughout the same, Figure 1 is a side elevation of coupling apparatus embodying my invention, showing the same in use, Fig. 2 is a plan view of the same, Fig. 3 is an enlarged side elevation of the same, with the latch locked in the operative position, Fig. 4 is a similar view, with the latch raised and one side plate removed, Fig. 5 is a detail sectional view taken on line 5—5 of Fig. 2, and, Fig. 6 is a fragmentary bottom plan view of a coupling member.

In the drawings, wherein for the purpose of illustration is shown a preferred embodiment of my invention, the numeral 5 designates the running gear of a wagon, embodying front and rear bolsters 6 and 7, connected by means of a reach 8, as is customary. These bolsters 6 and 7 carry standards 11 and 12 respectively, for receiving therebetween a hay rack 13, supported upon the bolsters, as shown. Secured to the rear end of the hay rack 13, at its bottom or floor, is a transverse bar or beam 14, as shown.

The numeral 15 designates a hay loader as a whole, of any well known or preferred type, traveling in the rear of the hay rack 13 to gather up and deliver the hay into the same.

My coupling apparatus embodies a forward preferably approximately U-shaped or V-shaped connecting member 18, having its arms 18' diverging rearwardly. This connecting member 18 is preferably formed or stamped from suitably stout sheet metal. The forward end of this member is detachably connected with the rear end of the reach 8, by means of a bolt 19 or the like. The arms 18' of the member 18, at their rear ends, are arranged beneath and adjacent the transverse bar 14 and are detachably rigidly connected therewith by means of bolts 20 or the like, passing through selected openings 20', formed therein, as shown. It is thus apparent that the rear end of the rack 13 is connected or coupled with the rear end of the pole, whereby the rack is connected with the running gear of the wagon and cannot move rearwardly off of the running gear.

Arranged adjacent the rear end of the approximately V-shaped member 18 is an approximately V-shaped or U-shaped coupling member or bail 21, the forward ends of which have apertures for receiving the bolts 20.

The numeral 22 designates a co-acting coupling member as a whole, adapted to be detachably locked to the coupling member or bail 21, in a manner to be described. The coupling member 22 embodies a body portion formed of spaced preferably vertical plates 23, the lower ends of which have horizontal flanges 24, bolted or otherwise attached to a plate 25, which is rigidly connected with the forward ends of rearwardly diverging arms 26. The plates have horizontal slots 23', as shown. Arranged between the plates 23 and pivotally connected therewith at 27, is a vertically swinging latch 28, the lower end of which is provided with a notch 29, formed between depending tongues 30 and 31. The tongue 31 is adapted to operate within a longitudinal slot 32 formed in a downwardly inclined tongue 33 carried by the plate 25. The tongue 31 also operates in the space between the spaced forward ends of the arms 26, as shown in Fig. 6. The upward movement of the latch 28 is positively limited by contact with a pin 34 carried by the plates 23 and a coil spring 35 is connected with this pin and with the upper end of a holding member or dog 36. This holding member or dog is arranged between the plates 23 and pivotally connected therewith, as shown at 37. The rearward movement of the holding member or dog 36 is positively limited by a stop 38. The holding member or dog 36 is provided upon its forward side with a recess affording a shoulder 39, adapted to engage beneath the lower edge of the rear end of the latch 28, thus serving to normally hold the rear end of this latch against downward swinging movement.

The rear ends of the arms 26 are suitably connected with the hay loader and may be attached to the axle thereof, or to any other portion of the hay loader.

From the foregoing description it is obvious that the coupling member or bail 21 is securely connected with the transverse bar 14 and this bar and coupling member are attached to the rear end of the pole 8 by means of connecting member 18. In this manner the hay rack 13 is prevented from moving rearwardly with respect to the bolsters of the wagon.

When it is desired to couple the hay loader 15 to the hay rack, such hay loader is brought into proximity to the rear end thereof. The holding member or dog 36 is swung rearwardly to release the latch 28. The forward end of the latch 28 is swung upwardly to assume the position shown in Fig. 4, which may be accomplished by engaging such end. The rear end of the latch 28 will now contact with the holding member 36 forwardly of and adjacent the shoulder 39. The coupling member or bail 21 is now introduced into the slots 23′, and by moving the coupling member 22 forwardly with relation to the bail 21, the bail enters the notch 29 while the latch 28 turns upon its pivot 27. The rear end of this latch now trips upon the shoulder 39 and engages above it, while the spring 35 automatically swings the holding member 36 forwardly. The latch 28 is now locked in the active position and the bail 21 held in the notch 29 by the tooth 30 until the holding member 36 is again swung rearwardly. When it is desired to disconnect the coupling member or bail 21 from the coupling member 22 the holding member 36 is swung rearwardly as above indicated and when the bail 21 is removed from the notch 30, it swings the latch 28 forwardly, thus arranging it in the proper position to again receive the bail, to lock the parts of the coupling together.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In combination, the reach of a wagon, a member secured to the rear end of a hay rack arranged upon the wagon, a substantially U-shaped forward coupling member having its arms diverging rearwardly, means connecting the forward end of the coupling member with the rear end of the reach, a rear second substantially U-shaped coupling member having its arms diverging forwardly, common means securing the ends of the substantially U-shaped coupling members with the member secured to the rear end of the hay rack, and latch mechanism adapted to be attached to a hay loader and detachably engaging with the rear substantially U-shaped coupling member.

2. In combination, a structure adapted to be connected with a hay loader, a substantially flat plate secured to the forward end of the structure and having its forward end bent downwardly to form a curved lip and provided rearwardly of and near this curved lip with a longitudinal opening, an upstanding plate mounted upon the substantially flat plate, a vertically swinging latch pivotally connected with the upstanding plate and provided at its forward end with a notch and spaced tongues arranged upon opposite sides of the notch with the rear tongue being formed longer and projecting into the longitudinal opening for operation therein, a dog pivoted near the latch to detachably engage therewith, a spring to move the dog in one direction, and a substantially U-shaped coupling member adapted to coöperate with the latch.

In testimony whereof I affix my signature in presence of two witnesses.

JAMES D. BAIRD.

Witnesses:
RALPH PRINGLE,
GLEE COX.

Copies of this patent may be obtained for five cents each, by addressing the "Commissioner of Patents, Washington, D. C."